United States Patent [19]

Daimon et al.

[11] Patent Number: 5,137,573
[45] Date of Patent: Aug. 11, 1992

[54] COATING COMPOSITION

[75] Inventors: Yasuo Daimon, Tondabayashi; Takashi Ban, Yamatotakada; Etsuji Sato; Yuji Ichihara, both of Kashiwara; Suezo Enomoto, Hirakata, all of Japan

[73] Assignee: Osaka Yuki Kagaku Kogyo Kabushiki Kaisha, Osaka, Japan

[21] Appl. No.: 771,885

[22] Filed: Oct. 7, 1991

Related U.S. Application Data

[63] Continuation of Ser. No. 517,977, May 1, 1990, abandoned, which is a continuation of Ser. No. 228,626, Aug. 5, 1988, abandoned.

[30] Foreign Application Priority Data

Apr. 22, 1988 [JP] Japan .................. 63-100951

[51] Int. Cl.$^5$ ................................ C09K 3/00
[52] U.S. Cl. ...................... 106/287.16; 428/412; 428/447; 528/19; 528/20; 106/287.1
[58] Field of Search .............. 428/412, 447; 106/287.11, 287.12, 287.14, 287.16; 528/19, 20

[56] References Cited

U.S. PATENT DOCUMENTS

| | | | |
|---|---|---|---|
| 4,197,230 | 4/1980 | Baney et al. | 428/500 |
| 4,275,118 | 6/1981 | Baney et al. | 428/412 |
| 4,311,738 | 1/1982 | Chi | 427/387 |
| 4,313,979 | 2/1982 | Frye et al. | 427/387 |
| 4,368,235 | 1/1983 | Vaughn, Jr. | 428/412 |
| 4,435,219 | 3/1984 | Greigger | 106/287.16 |
| 4,518,722 | 5/1985 | Schutt et al. | 523/135 |
| 4,539,351 | 8/1985 | O'Malley et al. | 524/43 |
| 4,571,365 | 2/1986 | Ashlock et al. | 428/412 |
| 4,624,870 | 11/1986 | Anthony | 427/387 |
| 4,719,146 | 1/1988 | Hohage et al. | 428/331 |
| 4,914,143 | 4/1990 | Patel | 522/148 |
| 5,024,697 | 6/1991 | Landers et al. | 106/14.13 |

FOREIGN PATENT DOCUMENTS

| | | |
|---|---|---|
| 0047160 | 3/1982 | European Pat. Off. |
| 0048114 | 3/1982 | European Pat. Off. |
| 52-39691 | 10/1977 | Japan |
| 54-87736 | 7/1979 | Japan |
| 59-68377 | 4/1984 | Japan |

OTHER PUBLICATIONS

Chemical Abstracts, 91, 159123t (1979).

Primary Examiner—William R. Dixon, Jr.
Assistant Examiner—Alan Wright
Attorney, Agent, or Firm—Armstrong & Kubovcik

[57] ABSTRACT

A coating composition comprising a colloidal silica, an organohydroxysilane, a partial condensate of the organohydroxysilane and a liquid medium containing ethylene glycol monobutyl ether in an amount of at least 20% by weight, which is applied to a substrate, shows excellent properties such as storage stability, workability for coating or painting, heat resistance, surface hardness, chemical resistance, abrasion resistance, scratch resistance, stain resistance and weather resistance.

8 Claims, No Drawings

COATING COMPOSITION

This application is a continuation of application Ser. No. 517,977, filed May 1, 1990, which is a continuation of Ser. No. 228,626, filed Aug. 5, 1988 both now abandoned.

BACKGROUND OF THE INVENTION

The present invention relates to a coating composition, and more particularly to a coating composition remarkably excellent in storage stability in comparison with conventional coating compositions, which can be suitably used as a coating material for a substrate such as metal.

Recent years, in electrical or electronic industry, there have been desired transparent coating materials having heat resistance, corrosion resistance, scratch resistance, weather resistance, and the like. Examples of the transparent coating materials are, for instance, transparent coating materials which have been used to protect reflectors of lighting equipments or thermal apparatuses, and the like.

In order to satisfy the above-mentioned requirements, there have hitherto been studied organic paints such as silicone resin and fluorine-containing resin, inorganic paints such as alkaline metal silicate, and the like. However, there has not yet been provided a coating composition sufficiently having the above properties. That is, with respect to the former, there are some defects in heat resistance, weather resistance, corrosion resistance and scratch resistance, and with respect to the latter, there are some defects in that an alkaline material remained in the coating material reacts with carbon dioxide gas present in air and a carbonate is deposited on the surface of the coating, which is so called "efflorescence", with the passage of time, and that the coating composition is poor in workability for coating.

It has been studied to use silica-organosilane coating compositions having abrasion resistance as a coating materials which are mainly coated on the surface of a plastic material. However, these coating materials are poor in storage stability and workability for coating. Accordingly, various investigations have been made to solve these problems. However, there has not yet been produced a coating material having the sufficient properties of matter. For instance, silica-organosilane compositions for coating having abrasion resistance are disclosed in Japanese Examined Patent Publication No. 39691/1977, Japanese Examined Patent Publication No. 18626/1981, and the like. However, these compositions are poor in workability for coating and storage stability since they contain a large amount of water derived from aqueous colloidal silica.

A composition for coating which solves the above-mentioned problems is proposed in Japanese Unexamined Patent Publication No. 68377/1984. The workability for application of the composition has been surely somewhat improved by distilling water from the composition. However, the composition has not yet been satisfied with storage stability. The process for preparing the composition is complicated since there is a necessity to distill water from the composition, and there are some defects in the composition that turbidity is easily generated, that the viscosity is easily increased and that the transparency of the coating film is deteriorated.

In consideration of the above-mentioned problems of prior art, in the course of studying to give a composition not only having suffient properties of matter such as heat resistance, surface hardness, chemical resistance, abrasion resistance, scratch resistance, stain resistance and weather resistance, but also having excellent storage stability and workability for coating, it has been found that the storage stability of the composition is remarkably improved by using as a solvent, a solvent containing a specified amount of ethylene glycol monobutyl ether in comparison with that of the conventional coating compositions, and the present invention has been accomplished.

SUMMARY OF THE INVENTION

According to the present invention, there is provided a coating composition comprising silica, organohydroxysilane, a partial condensate of the organohydroxysilane and liquid medium containing ethylene glycol monobutyl ether in an amount of at least 20 % by weight.

These and other objects of the invention will be apparent to one skilled in the art upon consideration of the following description and appended claims.

DETAILED DESCRIPTION

The coating composition of the present invention comprises silica, organohydroxysilane, partial condensate of the organohydroxysilane and liquid medium containing ethylene glycol monobutyl ether in an amount of at least 20 % by weight.

In the present invention, a colloidal silica is employed as the above-mentioned silica. The colloidal silica is usually used as a dispersion. The dispersion of the colloidal silica is classified into an aqueous dispersion of colloidal silica which is prepared by dispersing silicic anhydride having a high molecular weight in water and a non-aqueous dispersion which is prepared by dispersing the silicic anhydride in an alcoholic solvent. The aqueous dispersion of the colloidal silica is mainly used in the present invention. A part of the aqueous dispersion of the colloidal silica can be substituted by the non-aqueous dispersion of the colloidal silica.

The average particle size of the silica dispersed in the above-mentioned dispersion of the colloidal silica is preferably not more than 150 m$\mu$m and more preferably not more than 30 m$\mu$m. When the average particle size of the silica is more than 150 m$\mu$m, there is a tendency that the coating film does not become transparent.

The content of the silica in the above-mentioned dispersion of the colloidal silica is suitably adjusted to be within a range that dispersion is stable.

It is desirable that the dispersion of the colloidal silica is acidic since the storage stability of the obtained coating composition is lowered when the composition is basic.

The organohydroxysilane and the partial condensate of the organohydroxysilane used in the coating composition of the present invention are prepared by hydrolyzing organoalkoxysilane.

Typical examples of the above-mentioned organoalkoxysilane are, for instance, an organoalkoxysilane represented by the general formula (II):

$$R^1Si(OR^2)_3 \qquad (II)$$

wherein $R^1$ is a group selected from the group consisting of alkyl group having 1 to 3 carbon atoms, vinyl group, 3,4-epoxycyclohexyl ethyl group, gamma-glycidoxypropyl group, gamma-methacryloxypropyl group, gamma-mercaptopropyl group and gamma-chloropropyl group, and $R^2$ is a group selected from the group consisting of alkyl group having 1 to 4 carbon atoms, alkoxyethyl group having 1 to 4 carbon atoms and aryl group.

Typical examples of the organohydroxysilane prepared by hydrolyzing the above-mentioned organoalkoxysilane are, for instance, an organohydroxysilane represented by the general formula (I):

    (I)

wherein $R^1$ is the same as mentioned above.

Examples of the partial condensate of the organohydroxysilane are, for instance, oligomers prepared by subjecting the organohydroxysilane represented by the above-mentioned general formula (I) to a partial condensation.

In the coating composition of the present invention, the liquid medium is composed of (a) water contained in the aqueous dispersion of the colloidal silica and water derived from the condensation of the organohydroxysilane, (b) alcohol derived from hydrolysis of the organoalkoxylsilane and (c) a solvent.

In conventional coating compositions, lower aliphatic alcohols such as isopropanol are used as a main component of the solvent (c), and glycols such as ethylene glycol and propylene glycol; glycol derivatives such as ethylene glycol monoethyl ether; and aliphatic ketones such as acetone and methyl ethyl ketone are used as a co-solvent of the solvent (c). However, when these solvents are used in the coating composition, the coating composition does not satisfy all of the properties such as sufficient storage stability, workability for coating, film forming property and transparency of the coating film.

In the course of studying about the liquid medium contained in the coating composition, it is found that when ethylene glycol monobutyl ether is included in the liquid medium of the coating composition in an amount of at least 20 % by weight, storage stability, workability for coating and film forming property of the coating composition is remarkably improved and the coating film is excellent in transparency, and all of the defects of conventional coating compositions are removed. When ethylene glycol monoethyl ether or ethylene glycol monomethyl ether is used instead of ethylene glycol monobutyl ether in the coating composition, the effects derived from ethylene glycol monobutyl ether are not revealed. The remarkable effects are revealed only in case that ethylene glycol monobutyl ether is used as a solvent. Usually, there is a tendency that the storage stability of the silica-organosilane coating composition is lowered when the water content of the liquid medium is not less than 20 % by weight. For instance, the composition disclosed in Japanese Examined Patent Publication No. 39691/1977 does not have a sufficient storage stability since the liquid medium of the composition contains water in an amount of not less than 20 % by weight. The storage stability of the composition disclosed in Japanese Unexamined Patent Publication No. 68377/1984 is somewhat improved since the water contained in the composition is reduced to not more than 10 % by weight of the liquid medium by means of azeotropic distillation. However, the storage stability of the composition has not yet been sufficiently improved.

On the other hand, when ethylene glycol monobutyl ether is contained in the liquid medium in an amount of not less than 20 % by weight, it has been confirmed that the obtained coating composition has sufficient strorage stability even though the water content of the liquid medium is not less than 20 % by weight. Further, it has been confirmed that the obtained coating composition has not only excellent workability for coating, but also has no defects in film forming property and transparency of the coating film.

Furthermore, when ethylene glycol monobutyl ether is contained in the liquid medium in an amount of at least 20 % by weight of the liquid medium, it has been confirmed that the coating composition shows excellent film forming property and has a sufficient storage stability even though the solvents such as acetic esters and aliphatic ketones, which are the solvents imparting wrong film forming property to a silica-organisilane coating composition when the solvents are solely contained in the coating composition, are contained in the coating composition as a main solvent.

Examples of the solvents other than ethylene glycol monobutyl ether are, for instance, lower aliphatic alcohols such as methanol, ethanol, propanol, isopropanol, n-butanol and t-butanol; glycols such as ethylene glycol, propylene glycol and butylene glycol; glycol derivatives such as ethylene glycol monomethyl ether, ethylene glycol monoethyl ether and ethylene glycol monoethyl ether acetate; aliphatic ketones such as acetone, methyl ethyl ketone, methyl isobutyl ketone, cyclohexanone, isophorone and diacetone alcohol; and acetic esters such as ethyl acetate.

In the coating composition of the present invention, the solid component is composed of silica, organohydroxysilane and a partial condensate of organohydroxysilane. The solid content of the coating composition is adjusted to be within a range of 5 to 40 % by weight, preferably 10 to 30 % by weight based on the obtained coating composition with the aid of the solvent (c). When the solid content is less than 5 % by weight, it becomes difficult to control the thickness of the coating film, and when the solid content is more than 40% by weight, the workability for coating is lowered and the thickness of the coating film becomes too thick and cracking easily generates in the coating film.

The mixing ratio of the weight of the solid component of the above-mentioned silica to the weight of the solid components of the organohydroxysilane and the partial condensate of organohydroxysilane is adjusted to be within a range of 30/70 to 90/10, preferably within a range of 40/60 to 70/30. When the mixing ratio is less than 30/70, there is a tendency that the hardness and thermal resistance of the coating film is lowered, and when the mixing ratio is more than 90/10, there is a tendency that the coating film comes to be brittle.

It is desirable that the pH of the coating composition of the present invention is adjusted to be within a range of 2 to 7, preferably within a range of 3 to 6, more preferably within a range of 4 to 5 with the aid of, for instance, aqueous ammonia or organic amines such as triethanolamine and dimethyl aminoethanol. When the pH of the coating composition is either less than 2 or more than 7, there is a tendency that storage stability of the coating composition is lowered.

Examples of the process for preparing the coating composition of the present invention are, for instance, (i) a process comprising adding the organoalkoxysilane to the dispersion of colloidal silica, hydrolizing the mixture to give organohydroxysilane and a partial condensate of the oranohydroxysilane and diluting the reaction mixture with the solvent (c), (ii) a process comprising diluting the dispersion of colloidal silica with the solvent (c), adding the organoalkoxysilane to the dispersion, and hydrolyzing the mixture, and the like. In the present invention, any processes mentioned above can be employed.

When the organoalkoxysilane is added to the dispersion of the colloidal silica to hydrolyze the organoalkoxysilane, the hydrolysis is carried out at a liquid temperature of 10° to 80° C. under atmospheric pressure for about 1 to 24 hours with stirring. A part of the non-aqueous colloidal silica can be added after the completion of the reaction.

When the organoalkoxysilane is subjected to the hydrolysis, as a catalyst for hydrolysis, a small amount of inorganic acid or organic acid can be added to the dispersion.

Further, additives such as alcohol soluble resins as a component to impart flexibility to a coating film; coloring agents such as pigments and dyes; levelling agents, thickening agents and defoaming agents can be added to the coating composition of the present invention as occasion demands. Examples of the alcohol soluble resins are, for instance, resins soluble in lower aliphatic alcohols or in glycol derivatives such as butyral resins, acrylic resins and urethane resins.

The process for coating and curing the coating composition of the present invention on a substrate is explained hereinbelow.

Various conventional coating methods such as spraying, dipping, flow coating, roller coating, screen printing and electrostatic coating can be employed in the present invention.

After the coating composition is coated onto a substrate, the coated film is heated at 80° to 200° C. for 10 to 120 minutes to give a cured coating film being excellent in adhesion property to the substrate. The thickness of the coating film cannot be absolutely determined since the thickness of the coating film depends on the kinds of the substrate and the uses of the substrate. The thickness of the coating film is usually adjusted to be within a range of 1 to 100 $\mu$m, preferably within a range of 5 to 50 $\mu$m.

Examples of the substrate onto which the coating composition of the present invention can be applied are, for instance, metallic materials such as iron, stainless steel, aluminium, copper and brass; inorganic materials such as glass and ceramics; organic materials such as plastics, and the like. As mentioned above, various materials can be employed in the present invention. In the present invention, there is no necessity to apply a primer coating and the like on the surface of a substrate, and the coating film is superior in adhesion property to the substrate, to conventional coatings. The coating composition of the present invention can be applied onto the surface of a metallic or ceramic vacuum-evaporated film or a metal plated film.

The present invention is more specifically described and explained by means of the following examples. It is to be understood that the present invention is not limited to the examples, and various changes and modifications may be made in the invention without departing from the spirit and scope thereof. In each example and comparative example, all of "part" and "%" are by weight unless otherwise noted.

EXAMPLES 1 TO 5 AND COMPARATIVE EXAMPLES 1 TO 10

An amount of 184 parts of a dispersion of aqueous colloidal silica having a silica content of 30%, a particle size of 5 to 20 m$\mu$m and a pH of 3.0, and 100 parts of methyltrimethoxysilane were mixed together. After the mixture was stirred at 30° C. for 5 hours to complete the hydrolysis, to which the solvents shown in Table 1 was added. Then, the pH of the mixture was adjusted to be 4.5 by adding aqueous ammonia into the mixture to give a coating composition.

The properties of matter, i.e., (1) film property and (2) storage stability of the obtained coating compositions were investigated in accordance with the following methods. The results are shown in Table 3.

(1) Film property

An aluminium plate was coated with an obtained coating composition by method of spraying and the coated film was heated at 160° C. for 20 minutes to give a cured film having a thickness of about 10 $\mu$m. The plate was used as a test piece and the properties of matter of the coating film were measured in accordance with the following methods.

[A] Transparency

The coating film formed on the test piece was observed with the naked eyes, and the transparency was evaluated according to the following criteria.

○: There was no turbidity, and the substrate was clearly observed through the coating film.
Δ: There was a slight turbidity.
X: There was turbidity.

[B] Appearance of film

The coating film formed on the test piece was observed with the naked eyes.

[C] Pencil hardness test

Pencil hardness was evaluated in accordance with JIS K 5400.

[D] Adhesion test

After the test pieces were subjected to the cross-cut adhesion test in accordance with JIS D 0202. The numbers of remaining squares on the substrate were counted.

[E] Solvent resistance test

After the test pieces were dipped into toluene and isopropanol, respectively, for 24 hours at a room temperature (about 20° C.), the surface appearance of the coating film was observed with the naked eyes, and evaluated according to the following criteria.

○: There was no change.
Δ: There was generated a slight clouding in the coating film.
X: There was found erosion in the coating film.

[F] Boiling water resistance test

After the test pieces were dipped into boiling water for 10 hours, the surface appearance of the coating film was observed with the naked eyes, and was evaluated according to the following criteria.

○: There was no change.
Δ: There was generated a slight clouding or cracking in the coating film.
X: There was generated peeling of the film or cracking in the coating film.

[G] Salt spray test
After the test pieces were subjected to salt spray test for 1000 hours in accordance with JIS K 400, changes of the appearance of the coating film were observed with the naked eyes, and were evaluated according to the following criteria.
○: There was no change.
Δ: There was found a little rust.
X: There was found peeling of the coating film.

[H] Accelerated weathering test
After the test pieces were subjected to the accelerated weathering test by means of a Carbon-arc-sunshine Weather-O-meter for 2000 hours, changes of the appearance of the coating film were observed with the naked eyes, and were evaluated according to the following criteria.
○: There was no change.
Δ: There was generated a slight clouding and cracking in the coating film.
X: There was generated turbidity, blistering, peeling and cracking in the coating film.

[I] Heat resistance test
After the test pieces were allowed to stand in the atmosphere having a temperature of 200° C., 300° C., 400° C. and 500° C., respectively, for 24 hours, changes of the appearance of the coating film were observed with the naked eyes. The temperature when changes were not observed, was defined as a temperature of heat resistance.

(2) Storage stability test:
A container was charged with the coating composition and was sealed. The sealed container was allowed to stand in the atmosphere having a temperature of 50° C., and changes of the coating composition was observed with the naked eyes as well as an aluminium plate was coated with the coating conposition by method of spraying and was heated at 160° C. for 20 minutes everyday. Changes of the coating film were observed with the naked eyes.

TABLE 1

| | Charged amount (part) | | | | | |
|---|---|---|---|---|---|---|
| Ex. No. | Aqueous colloidal silica having a solid content of 30% | Methyl trimethoxy silane | Isopropanol | Derivative of glycol | Aliphatic ketone | Ester |
| 1 | 184 | 100 | 154 | EGMBE 84 | — | — |
| 2 | 184 | 100 | 113 | EGMBE 125 | — | — |
| 3 | 184 | 100 | — | EGMBE 238 | — | — |
| 4 | 184 | 100 | — | EGMBE 125 | MEK 113 | — |
| 5 | 184 | 100 | — | EGMBE 125 | — | EAc 113 |
| Com. Ex. 1 | 184 | 100 | 238 | — | — | — |
| Com. Ex. 2 | 184 | 100 | 197 | EGMBE 41 | — | — |
| Com. Ex. 3 | 184 | 100 | 113 | EGMEE 125 | — | — |
| Com. Ex. 4 | 184 | 100 | 113 | EGMME 125 | — | — |
| Com. Ex. 5 | 184 | 100 | — | EGMEE 238 | — | — |
| Com. Ex. 6 | 184 | 100 | — | EGMME 238 | — | — |
| Com. Ex. 7 | 184 | 100 | — | — | MEK 238 | — |
| Com. Ex. 8 | 184 | 100 | — | — | — | EAc 238 |
| Com. Ex. 9 | 184 | 100 | — | DEGDME 238 | — | — |
| Com. Ex. 10 | 184 | 100 | — | — | — | EGMMEA 238 |

| | Liquid medium in the composition (%) (% on the basis of liquid medium) | | | | | | |
|---|---|---|---|---|---|---|---|
| Ex. No. | Water | Alcohol | Derivative of glycol | Aliphatic ketone | Ester | pH of the composition | Solid content of the composition (%) |
| 1 | 26.1 | MA 16.9 IPA 36.9 | EGMBE 20.1 | — | — | 4.5 | 20.0 |
| 2 | 26.1 | MA 16.9 IPA 27.1 | EGMBE 29.9 | — | — | 4.5 | 20.0 |
| 3 | 26.1 | MA 16.9 | EGMBE 57.0 | — | — | 4.5 | 20.0 |
| 4 | 26.1 | MA 16.9 | EGMBE 29.9 | MEK 27.1 | — | 4.5 | 20.0 |
| 5 | 26.1 | MA 16.9 | EGMBE 29.9 | — | EAc 27.1 | 4.5 | 20.0 |
| Com. Ex. 1 | 26.1 | MA 16.9 IPA 57.0 | — | — | — | 4.5 | 20.0 |
| Com. Ex. 2 | 26.1 | MA 16.9 IPA 47.2 | EGMBE 9.8 | — | — | 4.5 | 20.0 |
| Com. Ex. 3 | 26.1 | MA 16.9 IPA 27.1 | EGMEE 29.9 | — | — | 4.5 | 20.0 |
| Com. Ex. 4 | 26.1 | MA 16.9 IPA 27.1 | EGMME 29.9 | — | — | 4.5 | 20.0 |
| Com. Ex. 5 | 26.1 | MA 16.9 | EGMEE 57.0 | — | — | 4.5 | 20.0 |
| Com. Ex. 6 | 26.1 | MA 16.9 | EGMME 57.0 | — | — | 4.5 | 20.0 |
| Com. Ex. 7 | 26.1 | MA 16.9 | — | MEK 57.0 | — | 4.5 | 20.0 |
| Com. Ex. 8 | 26.1 | MA 16.9 | — | — | EAc 57.0 | 4.5 | 20.0 |
| Com. Ex. 9 | 26.1 | MA 16.9 | DEGDME 57.0 | — | — | 4.5 | 20.0 |
| Com. Ex. 10 | 26.1 | MA 16.9 | — | — | EGMMEA | 4.5 | 20.0 |

TABLE 1-continued 57.0

(Note)
EGMBE: Ethylene glycol monobutyl ether,
EGMEE: Ethylene glycol monoethyl ether
EGMME: Ethylene glycol monomethyl ether,
DEGDME: Diethylene glycol dimethyl ether
MEK: Methyl ethyl ketone,
MA: Methanol,
EAc: Ethyl Acetate,
EGMMEA: Ethylene glycol monomethyl ether acetate,
IPA: Isopropanol

EXAMPLES 6 AND 7

The procedure of Example 1 was repeated except that the amounts of the dispersion of the aqueous colloidal silica and the solvent (isopropanol/ethylene glycol monobutyl ether) were changed to give coating compositions. The amounts are shown in Table 2.

The obtained coating composition was observed in the same manner as in Example 1. The results are shown in Table 3.

TABLE 2

| Ex. No. | Charged amount (parts) | | | | Liquid medium in the composition (% on the basis of liquid medium) | | | | pH of the composition | Solid content of the composition (%) |
|---|---|---|---|---|---|---|---|---|---|---|
| | Aqueous colloidal silica having solid content of 30% | Methyl trimethoxy-silane | Iso-propanol | Ethylene glycol monobutyl ether | Water | Methanol | Iso-propanol | Ethylene glycol monobutyl ether | | |
| 6 | 92 | 100 | 97 | 95 | 14.5 | 23.0 | 31.6 | 30.9 | 4.5 | 20.0 |
| 7 | 368 | 100 | 138 | 192 | 37.3 | 11.0 | 21.6 | 30.1 | 4.5 | 20.0 |
| 8 | 92 | 100 | — | 29 | 30.9 | 49.0 | — | 20.1 | 4.5 | 34.8 |
| 9 | 92 | 100 | — | 93 | 21.4 | 33.9 | — | 44.7 | 4.5 | 27.0 |
| 10 | 92 | 100 | — | 399 | 8.7 | 13.7 | — | 77.6 | 4.5 | 13.0 |
| 11 | 92 | 100 | — | 1346 | 3.1 | 4.8 | — | 92.1 | 4.5 | 5.0 |
| 12 | 184 | 100 | 113 | 125 | 26.1 | 16.9 | 27.1 | 29.9 | 2.5 | 20.0 |
| 13 | 184 | 100 | 113 | 125 | 26.1 | 16.9 | 27.1 | 29.9 | 6.5 | 20.0 |
| 14 | 184 | 100 | 113 | 125 | 26.1 | 16.9 | 27.1 | 29.9 | 4.5 | 20.0 |

EXAMPLES 8 TO 11

The procedure of Example 6 was repeated except that the amount of ethylene glycol monobutyl ether was changed as shown in Table 2 and that the isopropanol was not used to give coating compositions.

The obtained coating compositions were observed in the same manner as in Example 1. The results are shown in Table 3.

EXAMPLES 12 AND 13

The procedure of Example 2 was repeated except that the pH of the composition was changed to 2.5 (Example 12) or 6.5 (Example 13) to give coating compositions.

The obtained coating compositions were observed in the same manner as in Example 1. The results are shown in Table 3.

EXAMPLE 14

The procedure of Example 2 was repeated except that triethanolamine was used instead of the aqueous ammonia to give a coating composition.

EXAMPLE 15

An amount of 30 parts of a dispersion of an aqueous colloidal silica having a silica content of 20%, a particle size of 5 to 20 mμm and a pH of 3.0, 36.7 parts of methyl triethoxysilane and 0.1 part of acetic anhydride were mixed together. After the mixture was stirred at 30° C. for 24 hours to complete the hydrolysis, to which 32 parts of ethanol was added. Then the excess water in the mixture was removed by azeotropic distillation with the ethanol at 30° C. under a reduced pressure of 100 Torr. An amount of 50 parts of ethylene glycol monobutyl ether was added to the mixture to give a coating composition having a solid content of about 20%.

The properties of matter of the obtained coating composition was observed in the same manner as in Example 1. The results are shown in Table 3.

COMPARATIVE EXAMPLE 11

The procedure of Example 15 was repeated except that an amount of 50 parts of isobutanol was used instead of 50 parts of ethylene glycol monobutyl ether to give a coating composition.

The obtained coating composition was observed in the same manner as in Example 1. The results are shown in Table 3.

TABLE 3

| | | | Film property | | | | |
|---|---|---|---|---|---|---|---|
| | Transparency | Appearance of film | Pencil hardness test | Adhesion test | Solvent resistance test | Boiling water resistance test | Salt spray test |

TABLE 3-continued

| Ex. No. | | | | | | | |
|---|---|---|---|---|---|---|---|
| 1 | O | Excellent | 5H | 100 | O | O | O |
| 2 | O | Excellent | 5H | 100 | O | O | O |
| 3 | O | Excellent | 5H | 100 | O | O | O |
| 4 | O | Excellent | 5H | 100 | O | O | O |
| 5 | O | Excellent | 5H | 100 | O | O | O |
| 6 | O | Excellent | 4H | 100 | O | O | O |
| 7 | O | Excellent | 6H | 100 | O | O | O |
| 8 | O | Excellent | 4H | 100 | O | O | O |
| 9 | O | Excellent | 4H | 100 | O | O | O |
| 10 | O | Excellent | 4H | 100 | O | O | O |
| 11 | O | Excellent | 4H | 100 | O | O | O |
| 12 | O | Excellent | 5H | 100 | O | O | O |
| 13 | O | Excellent | 5H | 100 | O | O | O |
| 14 | O | Excellent | 5H | 100 | O | O | O |
| 15 | O | Excellent | 4H | 100 | O | O | O |
| Com. Ex. | | | | | | | |
| 1 | O | Excellent | 5H | 100 | O | O | O |
| 2 | O | Excellent | 5H | 100 | O | O | O |
| 3 | O | Excellent | 5H | 100 | O | | |
| 4 | O | Repellent | 2H | 100 | O | Δ to X | Δ |
| 5 | — | Repellent | — | — | — | — | — |
|  |  | Film was not formed |  |  |  |  |  |
| 6 | — | Repellent | — | — | — | — | — |
|  |  | Film was not formed |  |  |  |  |  |
| 7 | — | Repellent | — | — | — | — | — |
|  |  | Film was not formed |  |  |  |  |  |
| 8 | O | Repellent | 2H | 100 | O | Δ to X | Δ |
| 9 | O | Repellent | 2H | 100 | O | Δ to X | Δ |
| 10 | — | Repellent | — | — | — | — | — |
|  |  | Film was not formed |  |  |  |  |  |
| 11 | X | Excellent | 4H | 100 | O | O | Δ |

| | Film property | | Storage stability test (accelerated at 50° C.) | |
|---|---|---|---|---|
| | Accelerated weathering test | Temperature of heat resistance (°C.) | Coating composition | Appearance of film |
| Ex. No. | | | | |
| 1 | O | 300 | On the 60th day, a slight turbidity was observed. | On the 60th day, a slight clouding was observed. |
| 2 | O | 500 | On the 60th day, changes have not yet been observed. | On the 60th day, changes have not yet been observed. |
| 3 | O | 500 | On the 60th day, changes have not yet been observed. | On the 60th day, changes have not yet been observed. |
| 4 | O | 500 | On the 60th day, changes have not yet been observed. | On the 50th day, film became cloudy. |
| 5 | O | 500 | On the 60th day, changes have not yet been observed. | On the 50th day, film became cloudy. |
| 6 | O | 300 | On the 60th day, changes have not yet been observed. | On the 60th day, changes have not been yet observed. |
| 7 | O | 500 | On the 60th day, a slight turbidity was observed. | On the 60th day, a slight clouding was observed. |
| 8 | O | 300 | On the 50th day, a slight turbidity was observed. | On the 50th day, a slight clouding was observed. |
| 9 | O | 300 | On the 60th day, changes have not yet been observed. | On the 60th day, changes have not yet been observed. |
| 10 | O | 300 | On the 60th day, changes have not yet been observed. | On the 60th day, changes have not yet been observed. |
| 11 | O | 300 | On the 60th day, changes have not yet been observed. | On the 60th day, changes have not yet been observed. |
| 12 | O | 400 | On the 50th day, a slight turbidity was observed. | On the 50th day, a slight clouding was observed. |
| 13 | O | 500 | On the 60th day, changes have not yet been observed. | On the 60th day, changes have not yet been observed. |
| 14 | O | 500 | On the 60th day, changes have not yet been observed. | On the 60th day, changes have not yet been observed. |
| 15 | O | 300 | On the 50th day, a slight turbidity was observed. | On the 50th day, a slight clouding was observed. |
| Com. Ex. | | | | |
| 1 | O | 500 | On the 15th day, the composition gelled. | On the 5th day, film became cloudy. |
| 2 | O | 500 | On the 20th day, the composition became turbid. | On the 20th day, film became cloudy. |
| 3 | O | 500 | On the 30th day, the composition became turbid. | On the 5th day, film became cloudy. |
| 4 | — | 500 | On the 30th day, the composition became turbid. | On the 10th day, film should repellency. |
| 5 | — | — | — | — |
| 6 | — | — | — | — |
| 7 | — | — | — | — |
| 8 | — | 500 | On the 20th day, the | On the 10th day, film |

TABLE 3-continued

| | | | composition became turbid. | became cloudy. |
|---|---|---|---|---|
| 9 | — | 500 | On the 40th day, the composition became turbid. | On the 30th day, film became cloudy. |
| 10 | — | — | — | — |
| 11 | X | 300 | On the 20th day, the composition became turbid. | On the 20th day, cracking was observed in film. |

The coating compositon prepared in Example 1 was allowed to stand for about one year in an atmosphere having a room temperature to observe the storage stability. As the results, there was not found abnormal changes in the coating composition and the properties of the coating film. The storage stability of the coating composition prepared in Comparative Example 1 was also observed in an atmosphere having a room temperature. As the results, after 3 months, the composition gelled.

In Table 3, the mark "—" means that the coating film was not formed. Accordingly, the properties of matter were not evaluated.

As mentioned-above, the coating composition of the present invention is sufficiently improved in storage stability which has been desired in conventional coating compositions. That is, the coating composition of the present invention shows remarkably excellent storage stability for a long period of time, i.e., not less than one year although conventional coating compositions show storage stability for about not more than 3 months at a room temperature. Further, the process for preparing the coating composition of the present invention is very simple and convenient since there is no necessity to remove water from the coating composition by means of a complicated process of azeotropic distillation in order to control the water content in the coating composition. The various solvents, which could not been used in the conventional coating compositions, can be used since the film forming property of the coating composition of the present invention is not deteriorated even though the solvents are contained. Further, according to the present invention, the coating composition having excellent storage stability is provided even though the composition has a large solid content.

The present invention shows not only improved storage stability but also remarkably enlarged the range of the formulations. Accordingly, the coating composition of the present invention can be applied to various uses.

Reasonable modification and variation are within the scope of this invention which is directed to novel coating compositions.

What is claimed is:

1. A coating composition comprising silica, organohydroxysilane, a partial condensate of the organohydroxysilane and a solvent containing at least 20% by weight of ethylene glycol monobutyl ether and 5 to 40% by weight of solids and having a pH of 2.5 to 6.5, wherein the weight ratio of the solids of said silica to said organohydroxysilane and said partial condensate of organohydroxysilane is 30/70 to 90/10.

2. The coating composition of claim 1, wherein said silica is a colloidal silica.

3. The coating composition of claim 1, wherein said silica is an acidic colloidal silica.

4. The coating composition of claim 1, wherein said organohydroxysilane is a compound represented by the general formula (I):

$$R^1SI(OH)_3 \qquad (I)$$

wherein $R^1$ is a group selected from the group consisting of alkyl group having 1 to 3 carbon atoms, vinyl group, 3,4-epoxycyclohexyl ethyl group, gamma-glycidoxypropyl group, gamma-methacryloxypropyl group, gamma-mercaptopropyl group and gamma-chloropropyl group.

5. The coating composition of claim 1, wherein the solid components comprise the silica, the organohydroxysilane and the partial condensate of the organohydroxysilane.

6. A coating composition according to claim 1, wherein the solids content is 10 to 30% by weight.

7. A coating composition according to claim 1, wherein said weight ratio of the solids is 40/60 to 70/30.

8. A coating composition according to claim 1, wherein said pH is 3 to 6.

* * * * *